April 7, 1942. W. D. JOHNSON Re. 22,061
CUTTER-HEAD QUICK RELEASE
Original Filed March 21, 1927
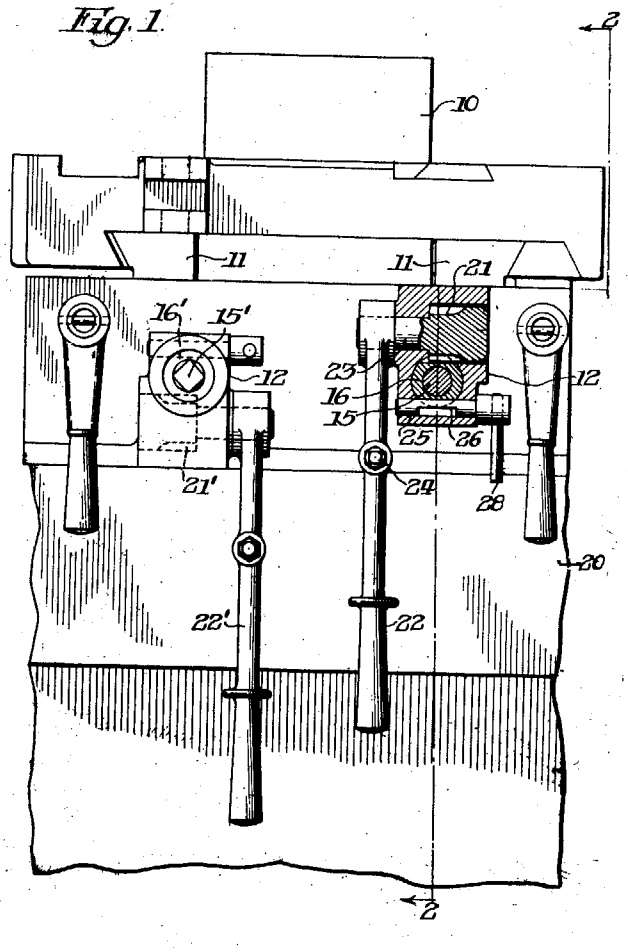
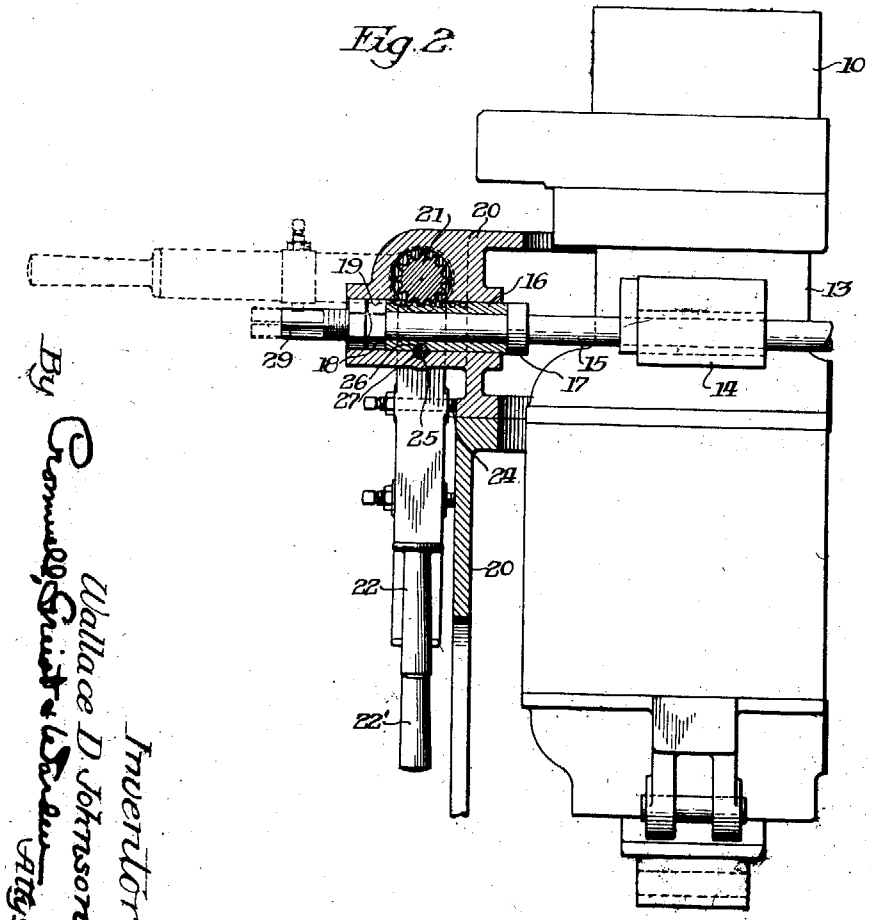
Inventor
Wallace D. Johnson.
By Cromwell, Greist & Warden
Attys Reissued Apr. 7, 1942

Re. 22,061

UNITED STATES PATENT OFFICE 22,061

CUTTER-HEAD QUICK RELEASE

Wallace D. Johnson, Beloit, Wis., assignor to Yates-American Machine Company, Beloit, Wis., a corporation of Delaware Original No. 1,763,928, dated June 17, 1930, Serial No. 177,026, March 21, 1927. Application for reissue July 12, 1939, Serial No. 284,050

9 Claims. (Cl. 144—130)

This invention pertains to wood-working machines, such as planers and matchers, and is particularly concerned with the way in which the side heads of the machines are withdrawn from working position.

The principal object of the invention is to provide an improved release by means of which a side head may be quickly withdrawn.

Another important object is to provide, in connection with such a release, an improved adjuster by means of which the working position of the side head may be accurately set and preserved notwithstanding occasional withdrawals of the same from working position.

Other objects and advantages of the invention will be evident to those skilled in the art upon a full understanding of the construction and operation of the improved device.

One form of the invention is presented herein for the purpose of exemplification, but it will be appreciated of course that the invention is susceptible of embodiment in other slightly different structural forms coming equally within the true and intended scope of the appended claims.

In the accompanying drawing:

Fig. 1 is a fragmentary side view of a wood-working machine, showing two of the quick release devices connected with two opposed side head units; and Fig. 2 is a vertical transverse section through the machine frame and one of the quick release devices, taken on the line 2—2 of Fig. 1, showing in elevation the side head unit to which that particular device is connected.

The drawing illustrates fragmentarily a wood-working machine which is provided with two side head units 10. Only one of the units may be observed in the drawing, however, for the reason that in Fig. 1 one of the units is totally obscured by the other. The units are slidably mounted on spaced guide rails 11, and are movable along the rails into or out of working position by means of two devices 12 which are connected with the units. The two devices, except for being reversed in position, are substantially the same, and only that device which is connected with the unit shown in the drawing need therefore be described.

The frame 13 of the unit is provided with a lug 14, and one portion of a rod 15 is in screw-threaded engagement with the lug. Another portion of the rod 15 is rotatably mounted within a tubular rack 16, and is held against endwise movement therein by a fixed collar 17 on the rod at one end of the rack and a removable collar 18 on the rod in the form of two interlocked nuts at the other end of the rack.

The rack 16 is slidably positioned within an aperture 19 in the frame 20 of the machine, and a pinion 21 is rotatably mounted in the frame in mesh with the rack. A long hand lever 22 is secured to an axial extension 23 of the pinion, and is provided with a set screw 24 for abutment with the frame 20. The lever 22 moves the pinion 21, and the pinion in turn moves the rack 16.

When the side head unit is in working position, the lever 22 extends downwardly, as shown in full lines in Fig. 2, and, when the unit is withdrawn from working position, the lever extends outwardly, as shown in dotted lines in Fig. 2.

A key 25 is rotatably mounted in the frame 20, and is provided with a semi-cylindrical portion 26 which occupies a key-way 27 in the rack 16 when the lever 22 is in working position. The purpose of the previously described set screw 24 is to bring the lever 22 to stop in a position where the key-way 27 in the rack is in alignment with the key 25. When the portion 26 of the key is turned into the key-way in the rack, the rack is locked against endwise movement and when the portion 26 is turned out of the key-way, the rack is free to move. The key 25 is turned into or out of locking position by means of a handle 28 which is secured to one end of the same.

The working position of the side head may be varied by turning the rod 15 in the rack, whereby to cause the rod to screw farther into or out of the lug 14 on the frame 13 of the unit. The outer end 29 of the rod is preferably of polygonal shape in order to make the turning of the same an easy matter.

To adjust the working position of the side head unit, the lever 22 is swung downwardly into working position, the handle 28 is turned to lock the rack against endwise movement, and the rod 15 is turned to bring the knives of the side head to the exact working position desired. To release the side head quickly for any reason without destroying adjustment in the working position of the same, it is merely necessary to turn the handle 28 to unlock the rack and then swing the lever 22 outwardly, whereupon the side head will be withdrawn to the extent indicated in Fig. 2 by the dotted line position of the end 29 of the rod 15. To return the side head again to the same working position, it is merely necessary to swing the lever 22 downwardly and turn the handle 28 to lock the rack.

The other side head unit may be adjusted and released in the same way. The device 12 associated with that unit differs from the one just described only in that the pinion 21′ is located below instead of above the rack 16′, in order that, when the lever 22′ is swung outwardly into release position, the rack 16′ with the rod 15′ and the side head unit will be shifted toward the opposite side of the machine.

I claim:

1. In a wood-working machine, the combination with a cutter head unit movable relative to the machine, of a screw-threaded connection for adjusting the working position of the unit, a pinion and rack connection for releasing the unit quickly from any adjusted working position and returning it accurately to the same, and a hand lever for operating the pinion and rack connection, said pinion and rack connection transmitting the movement of the hand lever directly to the unit, and said hand lever when moved in one direction rapidly retracting the unit from its adjusted working position and when moved the same distance in the opposite direction rapidly returning the unit to its previously adjusted working position.

2. In a wood-working machine, the combination with a cutter head unit movable relative to the machine, of means for adjusting the working position of the unit, and manually operated means connected with and acting through the adjusting means for releasing the unit quickly from any adjusted working position and returning it accurately to the same, said manually operated means including a member which when moved manually in one direction rapidly retracts the unit from its adjusted working position and when moved manually the same distance in the opposite direction rapidly returns the movement to its previously adjusted working position.

3. In a wood-working machine, the combination with a cutter head unit movable relative to the machine, of a quick release comprising a rack connected with the unit, a pinion meshed with the rack, readily releasable means for locking the unit in its working position, a hand lever connected with the pinion for turning the same, whereby to move the unit, and means for adjustably limiting the extent to which the hand lever may be swung in the working position of the unit.

4. In a wood working machine, the combination with a side head unit movable laterally of the machine, of a quick release comprising a rack connected with the unit for moving the same laterally of the machine, a pinion meshed with the rack, a hand lever connected with the pinion for turning the same whereby to move the unit laterally, and readily releasable means to lock the unit against such lateral movement.

5. In a wood-working machine, the combination with a side head unit movable laterally of the machine, of a quick release comprising a rod having a screw-threaded connection with the unit, a rack connected with the rod in such a way as to prevent endwise movement but permit rotary movement, a pinion meshed with the rack, a hand lever connected with the pinion for turning the same whereby to move the rack, rod and unit, and means for turning the rod in the rack whereby to adjust the position of the unit relative to the rack, said hand lever when moved in one direction causing the unit to be retracted from its working position to an inoperative position and when moved in the opposite direction through the same angle causing the unit to return to its original working position.

6. In a wood-working machine, the combination with a side head unit movable laterally of the machine, of a quick release comprising a rack connected with the unit, a pinion meshed with the rack, a hand lever connected with the pinion for turning the same whereby to move the unit, a key movable into a transverse groove in the rack, and means for moving the key into the groove whereby to lock the rack, said hand lever when moved in one direction causing the unit to be retracted from its working position to an inoperative position and when moved in the opposite direction through the same angle causing the unit to return to its original working position.

7. In a wood-working machine, the combination with a cutter head unit movable relative to the machine from a rigidly held working position to an out-of-the-way inoperative position, of means connected with the unit for adjusting the working position of the unit and holding the latter rigidly in its adjusted position, and manually operated means connected with and acting through said adjusting means for releasing and rapidly retracting the unit from any adjusted working position into said inoperative position and for rapidly returning the unit from its inoperative position accurately into the same adjusted working position, said manually operated means including a member which when moved manually in one direction rapidly retracts the unit from its adjusted working position and when thereafter moved manually the same distance in the opposite direction rapidly returns the unit to its previously adjusted working position.

8. In a wood-working machine, the combination with a cutter head unit movable relative to the machine from a rigidly held working position to an out-of-the-way inoperative position, of a screw connected with the unit for adjusting the working position of the unit and holding the latter rigidly in its adjusted position, and manually operated means connected with and acting through said screw for releasing and rapidly retracting the unit from any adjusted working position into said inoperative position and for rapidly returning the unit from its inoperative position accurately into the same adjusted working position, said means consisting of a swingable hand lever, a motion-converting device connecting the screw with the lever for causing axial movement of the screw upon swinging movement of the lever, means for stopping the swinging movement of the lever in an accurately predetermined position when the unit is returned to its working position, and means for locking the lever in such position against inadvertent movement in the opposite direction.

9. In a wood-working machine, the combination with a cutter head unit movable relative to the machine, of a screw threaded connection for predetermined adjustment of the working position of the unit, a readily releasable locking means for holding the unit in its predetermined adjusted position, and manually operated means connected with and operating through the adjusting means for releasing the unit quickly from its adjusted working position upon release of the locking means and for returning it accurately to its adjusted working position.

WALLACE D. JOHNSON.